(12) United States Patent
Ishibashi

(10) Patent No.: US 11,886,100 B2
(45) Date of Patent: Jan. 30, 2024

(54) SUPPORT APPARATUS FOR ELECTRONIC DEVICE, AND ELECTRONIC DEVICE

(71) Applicant: CASIO COMPUTER CO., LTD., Tokyo (JP)

(72) Inventor: Jumpei Ishibashi, Nishitokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/711,599

(22) Filed: Apr. 1, 2022

(65) Prior Publication Data
US 2022/0342282 A1    Oct. 27, 2022

(30) Foreign Application Priority Data

Apr. 21, 2021 (JP) .................................. 2021-071493

(51) Int. Cl.
G03B 17/56 (2021.01)
F16M 11/10 (2006.01)
F16M 11/42 (2006.01)

(52) U.S. Cl.
CPC ........... *G03B 17/561* (2013.01); *F16M 11/10* (2013.01); *G03B 17/563* (2013.01);
(Continued)

(58) Field of Classification Search
CPC .... G03B 17/56; G03B 17/561; G03B 17/563; G03B 17/566; F16M 11/02; F16M 11/04;
(Continued)

(56) References Cited

U.S. PATENT DOCUMENTS

| 3,866,547 A | 2/1975 | Guyton |
| 5,192,963 A | 3/1993 | Hill |

(Continued)

FOREIGN PATENT DOCUMENTS

| CN | 212960664 U | 4/2021 |
| CN | 213685979 U | 7/2021 |

(Continued)

OTHER PUBLICATIONS

U.S. Appl. No. 17/885,403; First Named Inventor: Junji Mukai; Title: "Stand for Device"; filed Aug. 10, 2022.

(Continued)

*Primary Examiner* — Clayton E. LaBalle
*Assistant Examiner* — Fang-Chi Chang
(74) *Attorney, Agent, or Firm* — Holtz, Holtz & Volek PC

(57) ABSTRACT

A support apparatus for an electronic device includes a support portion that movably supports the electronic device between a first position where an object stored in the electronic device is incapable of being taken out, and a second position where the stored object is capable of being taken out. The electronic device is attachable to the support portion, and the electronic device is moved between the first position and the second position by movement of the support portion. In addition, the support apparatus o includes a base portion to which the support portion is movably attached, and the movement of the support portion causes the electronic device to move between the first position and the second position.

15 Claims, 11 Drawing Sheets

(52) U.S. Cl.
CPC ........... *G03B 17/566* (2013.01); *F16M 11/42* (2013.01); *F16M 2200/044* (2013.01); *F16M 2200/068* (2013.01)

(58) Field of Classification Search
CPC ...... F16M 11/041; F16M 11/06; F16M 11/10; F16M 11/105; F16M 11/12; F16M 11/121; F16M 11/125; F16M 11/126; F16M 11/14; F16M 11/16; F16M 11/18; F16M 11/20; F16M 11/2007; F16M 11/2021; F16M 11/2035; F16M 11/2042; F16M 11/2057; F16M 11/2064; F16M 11/2078; F16M 11/24; F16M 11/38; F16M 11/42; F16M 13/00; F16M 13/02; F16M 13/022; F16M 13/04; F16M 2200/04; F16M 2200/047; F16M 2200/06; F16M 2200/061; F16M 2200/044; F16M 2200/068
See application file for complete search history.

(56) References Cited

U.S. PATENT DOCUMENTS

| | | | |
|---|---|---|---|
| 5,374,059 | A | 12/1994 | Huang |
| 5,876,005 | A | 3/1999 | Vasconi |
| 6,430,038 | B1 | 8/2002 | Helot et al. |
| 7,934,689 | B2 | 5/2011 | Chiu et al. |
| 8,035,957 | B2 | 10/2011 | Jung |
| 8,540,438 | B1 * | 9/2013 | Cronin .................. B66F 11/048 396/428 |
| 8,733,722 | B2 | 5/2014 | Hung |
| 9,266,243 | B2 | 2/2016 | Swartz et al. |
| 10,506,995 | B2 | 12/2019 | Ninomiya et al. |
| 2003/0218106 | A1 | 11/2003 | Pensel |
| 2007/0001070 | A1 | 1/2007 | Ericson |
| 2007/0050139 | A1 | 3/2007 | Sidman |
| 2008/0132786 | A1 | 6/2008 | Asai et al. |
| 2012/0182709 | A1 | 7/2012 | Asai et al. |
| 2013/0286623 | A1 | 10/2013 | Slipy et al. |
| 2014/0016029 | A1 * | 1/2014 | Huang .................. G03B 17/561 348/E5.026 |
| 2014/0192504 | A1 | 7/2014 | Richard et al. |
| 2014/0226281 | A1 | 8/2014 | Emami |
| 2015/0285429 | A1 * | 10/2015 | Le ........................ G03B 17/561 248/178.1 |
| 2015/0366336 | A1 | 12/2015 | Wong |
| 2015/0369418 | A1 | 12/2015 | Wong et al. |
| 2018/0320869 | A1 | 11/2018 | Yu et al. |
| 2019/0086022 | A1 | 3/2019 | Anderson et al. |
| 2020/0326060 | A1 | 10/2020 | Fitch |

FOREIGN PATENT DOCUMENTS

| | | | |
|---|---|---|---|
| JP | 3002484 | U | 9/1994 |
| JP | H0843934 | A | 2/1996 |
| JP | 2003322905 | A | 11/2003 |
| JP | 2004341189 | A | 12/2004 |
| JP | 2009069380 | A | 4/2009 |
| JP | 2014235242 | A | 12/2014 |
| JP | 2016165045 | A | 9/2016 |
| JP | 2016178993 | A | 10/2016 |
| JP | 2017037519 | A | 2/2017 |
| JP | 2017125609 | A | 7/2017 |

OTHER PUBLICATIONS

U.S. Appl. No. 17/885,416; First Named Inventor: Junji Mukai; Title: "Stand for Device"; filed Aug. 10, 2022.
Distribution of leaflets, Apr. 22 and 23, 2021.
Exception to Lack of Novelty of Invention (and English translation thereof) dated Sep. 29, 2021 filed in the Japanese Patent Office in Japanese Application No. 2021-139592 (which is a counterpart of related U.S. Appl. No. 17/885,403).
Exception to Lack of Novelty of Invention (and English translation thereof) dated Sep. 29, 2021 filed in the Japanese Patent Office in Japanese Application No. 2021-139594 (which is a counterpart of related U.S. Appl. No. 17/885,416).
The 73rd Annual Congress of the Japan Society of Obstetrics and Gynecology, Apr. 22 and 23, 2021.
Japanese Office Action (and an English translation thereof) dated Jul. 4, 2023, issued in Japanese Application No. 2021-139594 (which is a counterpart of related U.S. Appl. No. 17/885,416).
Office Action (Non-Final Rejection) dated Jul. 12, 2023, issued in related U.S. Appl. No. 17/885,403.
Cheesycam DIY pvc gimbal stand ring frame article dated Nov. 13, 2016, https://ftp.cheesycam.com/diy-pvc-gimbal-flg-ring-ring-stand/.
Chromlives camera handle grip for support mount on camera stabilizer sold on amazon dated Jun. 22, 2017, https://www.amazon.com/ChromLives-Handle-Grip-Handlegrip-Stabilizer/dp/B07332SM8W.
Tilta ring grip for gimbal sold on amazon dated Feb. 6, 2021, https://www.amazon.com/Tilta-Advanced-Ring-Grip-RS/dp/BO8PHX8CVS.
Wallach continuous zoom colposcope from Cooper Surgical Inc. product sell sheet dated Apr. 2018, https://www.coopersurgical.com/ detail/wallach-zoomscope-with-trulight/ and https://www.coopersurgical .com/detail/wallach-zoomstar-with-trulight/.
Office Action (Non-Final Rejection) dated May 25, 2023, issued in related U.S. Appl. No. 17/885,416.
Japanese Office Action dated Apr. 25, 2023 (and English translation thereof) issued in related JP Application No. 2021-139592.
Japanese Office Action dated Apr. 25, 2023 (and English translation thereof) issued in related JP Application No. 2021-139594.
Japanese Dismissal of Amendments and Decision of Rejection (and an English translation thereof) dated Nov. 7, 2023, issued in Japanese Application No. 2021-139594 (which is a counterpart of related U.S. Appl. No. 17/885,416).
Office Action (Final Rejection) dated Nov. 9, 2023, issued in related U.S. Appl. No. 17/885,416.
Office Action (Final Rejection) dated Oct. 24, 2023, issued in related U.S. Appl. No. 17/885,403.

* cited by examiner

SUPPORT APPARATUS FOR ELECTRONIC DEVICE, AND ELECTRONIC DEVICE

CROSS-REFERENCE TO RELATED APPLICATION

This application claims the benefit of Japanese Patent Application No. 2021-071493, filed on Apr. 21, 2021, the entire disclosure of which is incorporated by reference herein.

FIELD

The present disclosure relates generally to a support apparatus for an electronic device, and an electronic device.

BACKGROUND

In order to capture a still image or a moving image while suppressing a shake of an imaging device in image capturing, the image is captured using a stand that holds the imaging device. For example, Unexamined Japanese Patent Application Publication No. 2017-37519 discloses a stand that can hold an imaging device in a state in which the optical axis of the lens is set to be perpendicular to a floor surface of a building, in order to photograph the floor surface of the building.

SUMMARY

A support apparatus for an electronic device according to the present disclosure includes a support portion that movably supports the electronic device between a first position where an object stored in the electronic device is incapable of being taken out, and a second position where the stored object is capable of being taken out, wherein the electronic device is attachable to the support portion, and the electronic device is moved between the first position and the second position by movement of the support portion.

BRIEF DESCRIPTION OF THE DRAWINGS

A more complete understanding of this application can be obtained when the following detailed description is considered in conjunction with the following drawings, in which.

DETAILED DESCRIPTION

Hereinafter, an imaging device stand, which is an example of a support apparatus for an electronic device according to an embodiment of the present disclosure, and an imaging device, which is an example of an electronic device according to an embodiment of the present disclosure, are described with reference to the accompanying drawings.

Figure 1:
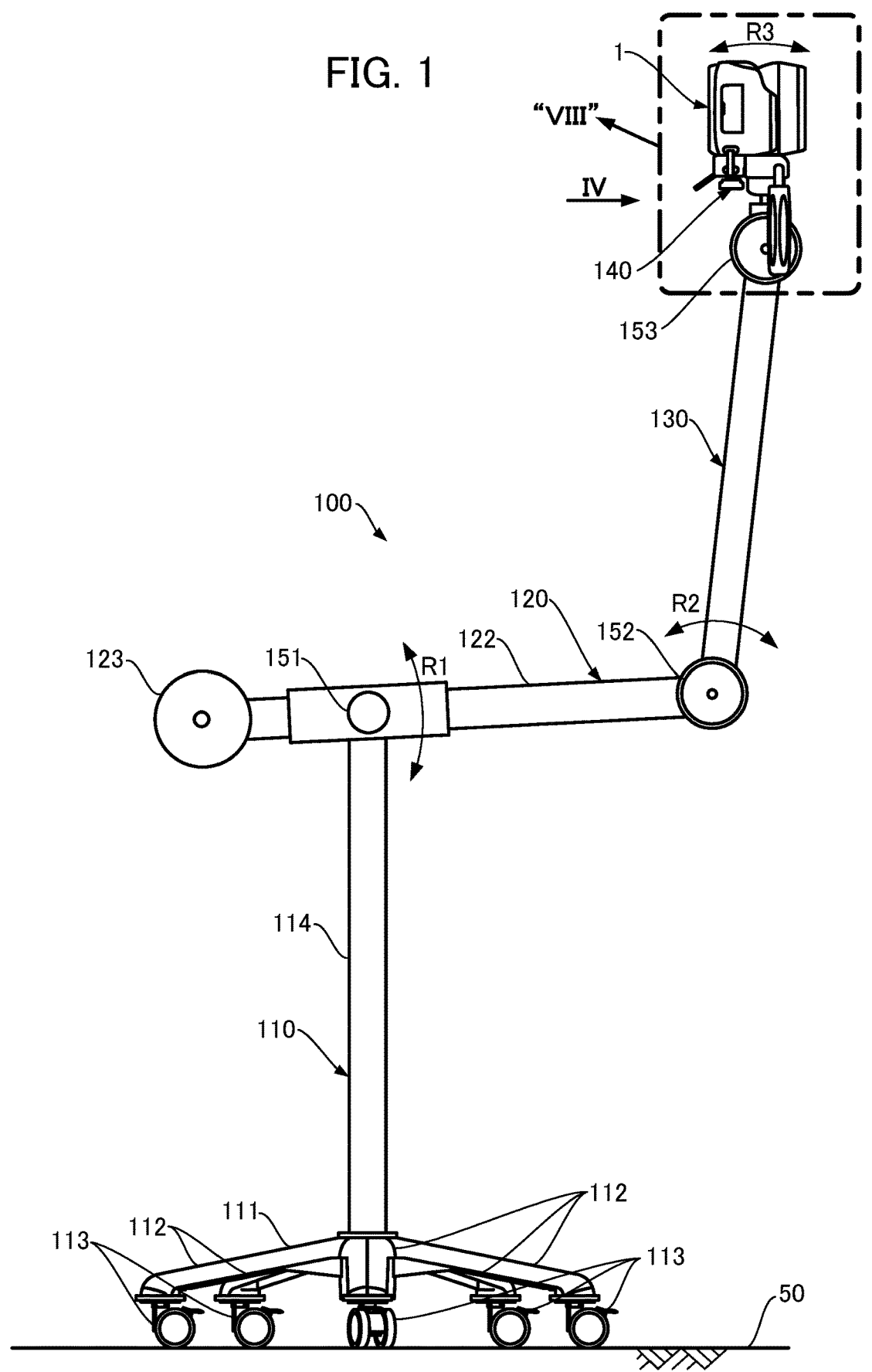
FIG. 1 is a schematic view illustrating a scene in which an image is captured using an imaging device and an imaging device stand, which are examples of an electronic device and a support apparatus for the electronic device according to embodiments of the present disclosure.

An imaging device 1, as illustrated in FIG. 1, is attached to a distal end of an imaging device stand 100, and an image can be thereby captured in a stable state in which a shake of the imaging device 1 in image capturing is suppressed. The imaging device 1 is, for example, a digital camera that photographs a subject. Note that in the description of the imaging device 1, as illustrated in FIG. 2A, FIG. 2B and FIG. 3, a direction, in which a cover plate 7 that makes reflective light from a imaging target incident into the imaging device 1 is provided, is defined as a forward direction of the imaging device 1, a direction opposite to this forward direction is defined as a rearward direction, and upward, downward, left and right directions at a time when the imaging device 1 disposed such that a shutter button 4 faces upward is viewed from the rear side are defined as upward, downward, left and right directions of the imaging device 1 as such.

Figure 2A:
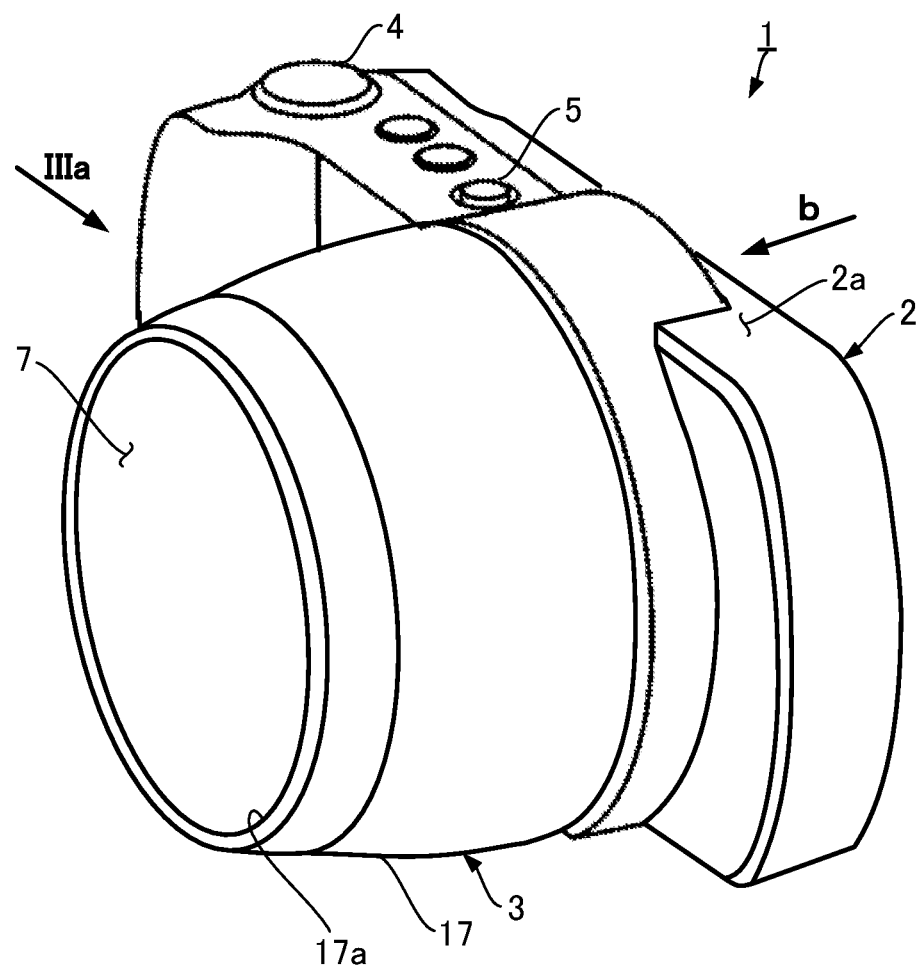
FIG. 2A is a perspective view illustrating the imaging device illustrated in FIG. 1.
Figure 2A:
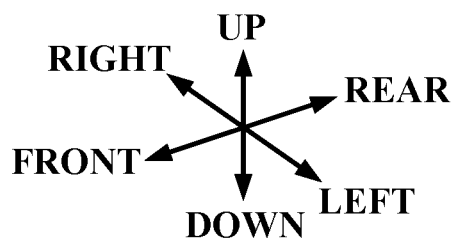
Figure 2B:
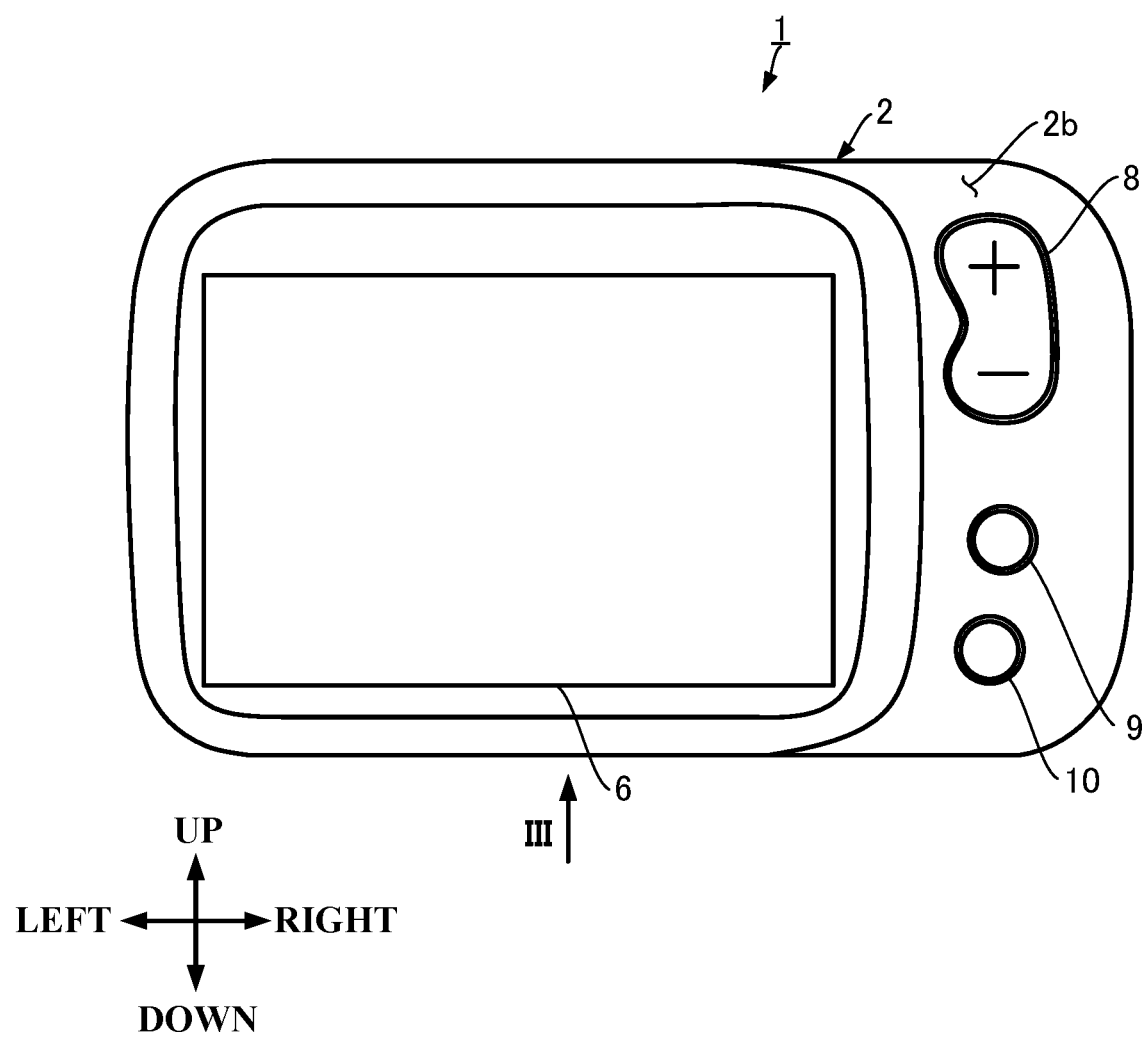
FIG. 2B is a back surface view illustrating the imaging device illustrated in FIG. 1, the imaging device being viewed in a direction of an arrow b in FIG. 2A.
Figure 3:
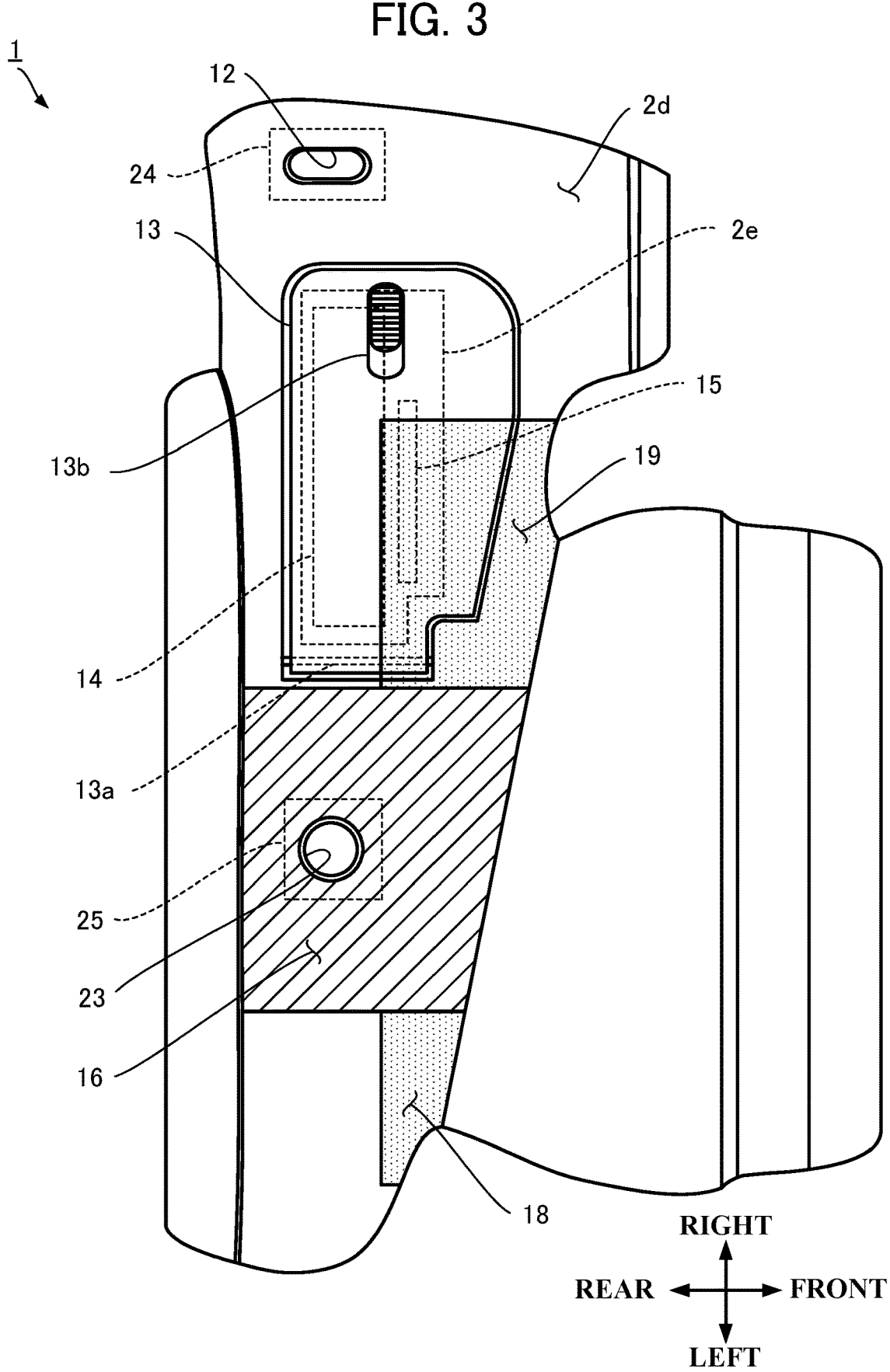
FIG. 3 is a bottom view of the imaging device as viewed in a direction of an arrow III in FIG. 2B.

The imaging device 1, as illustrated in FIG. 2A, includes a controller 2, and a main body 3 that is provided in front of the controller 2.

Figure 8:
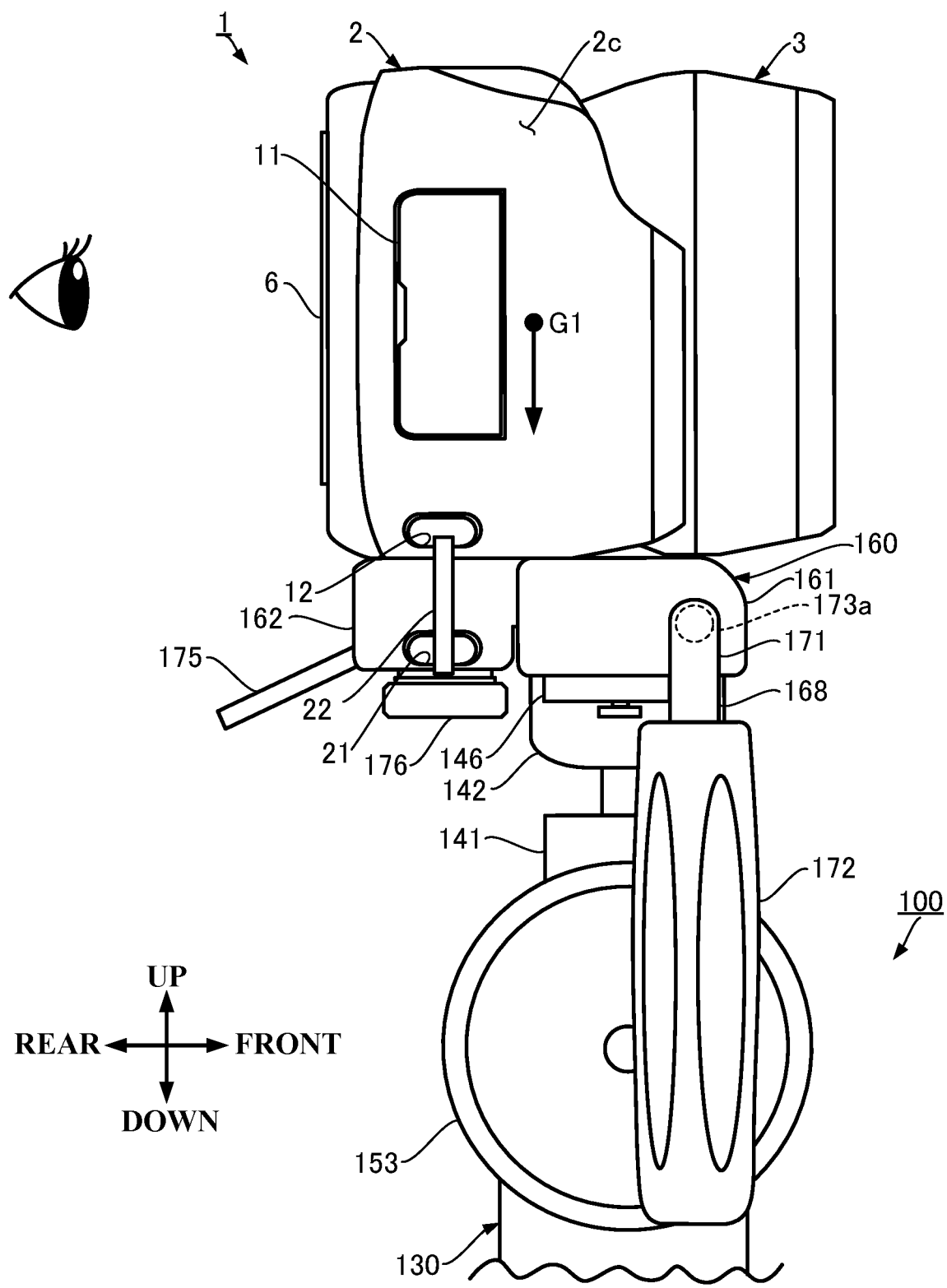
FIG. 8 is an enlarged view of a part "VIII" in FIG. 1.

As illustrated in FIG. 2A, operation buttons, such as the shutter button 4 and a power button 5, are provided on an upper surface 2a of the controller 2. As illustrated in FIG. 2B, a touch-panel-type liquid crystal monitor 6, and operation buttons, such as a zoom button 8 disposed on the right side of the liquid crystal monitor 6, a playback button 9 for displaying a captured image on the liquid crystal monitor 6, and a menu button 10, are provided on a back surface 2b of the controller 2. As illustrated in FIG. 8, a terminal cover 11, which covers a terminal for connection to an external device such as a television, is provided on a right surface 2c of the controller 2. In addition, in a corner portion where the right surface 2c and a lower surface 2d of the controller 2 intersect, a strap hole 12, which penetrates from the right surface 2c to the lower surface 2d, is formed as illustrated in FIG. 3 and FIG. 8. Furthermore, the lower surface 2d of the controller 2 is provided with a cover portion 13 covering such stored objects as a battery 14 that supplies electricity to the imaging device 1, and a recording medium 15 that records data obtained by image capturing, and is provided with a screw hole 23 for attachment to the imaging device stand 100 illustrated in FIG. 1.

The cover portion 13 covers a storing space 2e formed in the inside of the controller 2, and protects the battery 14 and recording medium 15 stored in the storing space 2e. The cover portion 13 includes a rotational shaft 13a extending in a back-and-forth direction on the left side, and a slide portion 13b that is urged toward the right, and, by the slide portion 13b being slid to the left, the cover portion 13 is unlocked and is made rotatable around the rotational shaft 13a. In this manner, by the cover portion 13 rotating around the rotational shaft 13a, the storing space 2e formed in the controller 2 is opened and closed. With the cover portion 13 opening the storing space 2e, the battery 14 and the recording medium 15 can be inserted and taken out. Note that the recording medium 15 is, for example, a memory card such as an SD card.

Figure 6:
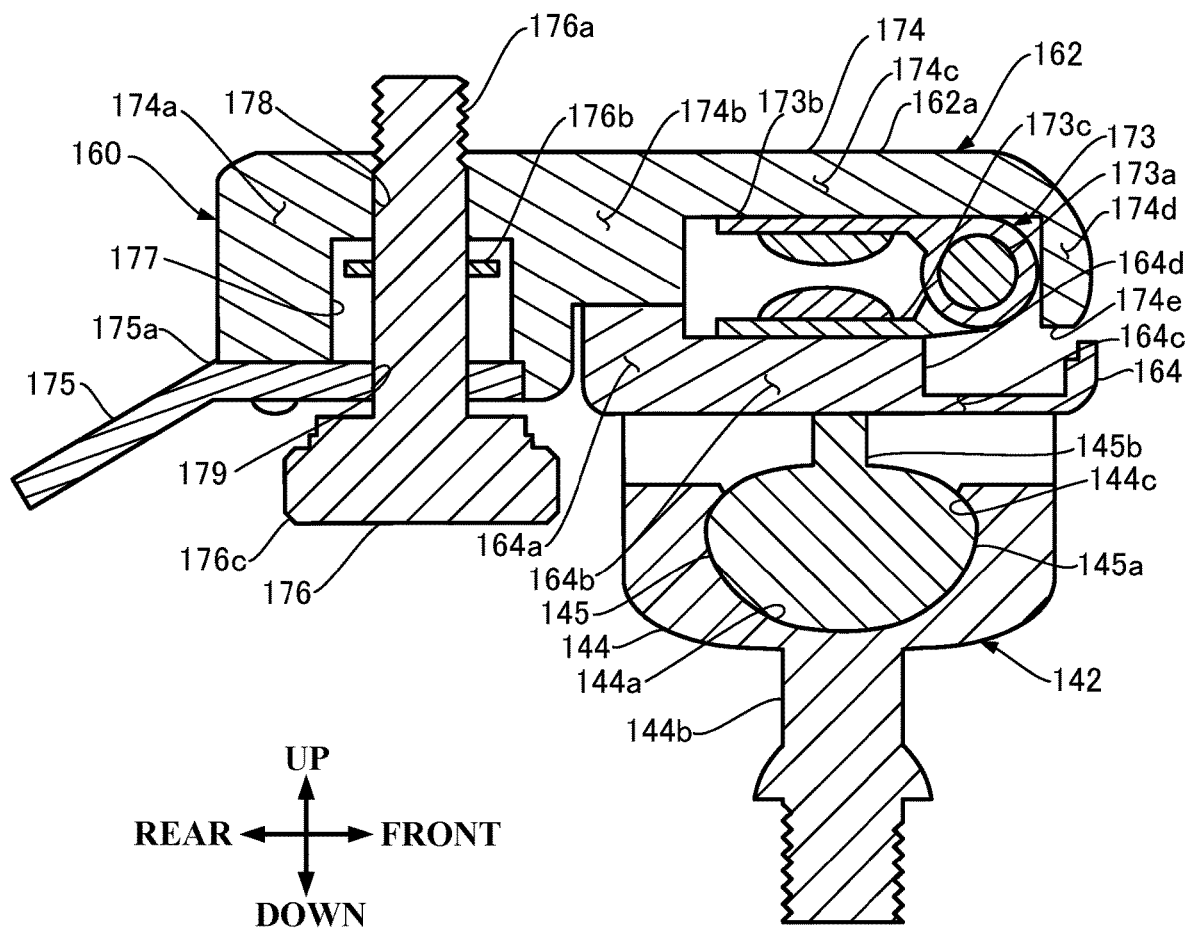
FIG. 6 is a cross-sectional view of the imaging device stand, taken along a cutting-plane line VI-VI in FIG. 4.

An attachment screw 176 illustrated in FIG. 6 is engaged in the screw hole 23. As illustrated in FIG. 3, around the screw hole 23 provided in the lower surface 2d serving as an attachment surface of the controller 2, a contact surface 16 is defined, and contact surfaces 18 and 19 are defined on both sides of the contact surface 16. In a case where the imaging device 1 is attached to the imaging device stand 100 illustrated in FIG. 4, the contact surface 16 comes in contact with an upper surface 162a (FIG. 4) of a rotational portion 162 (FIG. 4), and the contact surfaces 18 and 19 come in contact with an upper surface 161a (FIG. 4) of a base portion 161. Specifically, in a case where the rotational portion 162 is in an unrotated state, the contact surfaces 16, 18 and 19 are in a state in which the contact surfaces 16, 18 and 19 are covered by the rotational portion 162 and base portion 161 illustrated in FIG. 4. Note that, in FIG. 3, the ranges, in which the contact surfaces 16, 18 and 19 are formed, are indicated by hatching, so that these ranges can be understood. Thus, the hatching does not indicate a cross section.

The main body 3, as illustrated in FIG. 2A, includes a cylindrical portion 17 that is attached to the controller 2, and the cylindrical portion 17 includes therein an imaging lens system and an imaging element, which are not illustrated. In addition, the cover plate 7 that is formed in a circular shape is fitted in an opening 17a that is formed at a front end of the cylindrical portion 17. The cover plate 7 includes a light-transmissive member, for example, a glass cover, and the cover plate 7 passes reflective light from an imaging target and takes the reflective light into the inside of the imaging device 1.

In image capturing using the imaging device 1, the power button 5 is first pressed to power on the imaging device 1, and then a composition is determined while viewing an image of an imaging target, which is displayed on the liquid crystal monitor 6 (FIG. 2B) that functions as a finder. Then, the imaging target is photographed by operating the shutter button 4 (FIG. 2A). The photographed image is stored in the recording medium 15 illustrated in FIG. 3.

As illustrated in FIG. 1, the imaging device stand 100 includes a support leg 110 that is placed on a floor 50 of a building; a first arm 120 rotatably attached to an upper end of the support leg 110; a second arm 130 rotatably attached to one end of the first arm 120; and an attachment base 140 rotatably attached to one end of the second arm 130. In this manner, the first arm 120 and second arm 130 serving as an arm portion, and the attachment base 140 are connected to the support leg 110 that is placed on the floor 50.

The support leg 110 includes a base 111 including five projecting portions 112 radially extending from the center at equal angular intervals; casters 113 attached to the five projecting portions 112, respectively; and a columnar erect portion 114 that stands up from the center of the base 111. The five casters 113 attached to the radially extending projecting portions 112 roll on the floor 50, thereby enabling easy movement of the imaging device stand 100.

The first arm 120 includes an arm main body 122 attached to an upper end of the erect portion 114 in such a manner as to be rotatable about the center of a rotational shaft 151; and a counterweight 123 provided on the other end of the first arm 120, which is an end portion opposite to the one end of the first arm 120, to which the second arm 130 is attached. Note that the rotational shaft 151 is provided at a position that is closer to the other end than a middle of the arm main body 122, and the rotational shaft 151 supports the first arm 120 such that the first arm 120 is rotatable in a direction indicated by an arrow R1. The counterweight 123 is formed of a plurality of stacked discs of, for example, stainless steel, and keeps a balance with the weight on the one end side of the first arm 120.

An end portion of the second arm 130 is rotatably attached to the one end of the first arm 120. The second arm 130 is rotatable around a rotational shaft 152, as indicated by an arrow R2.

Figure 5:
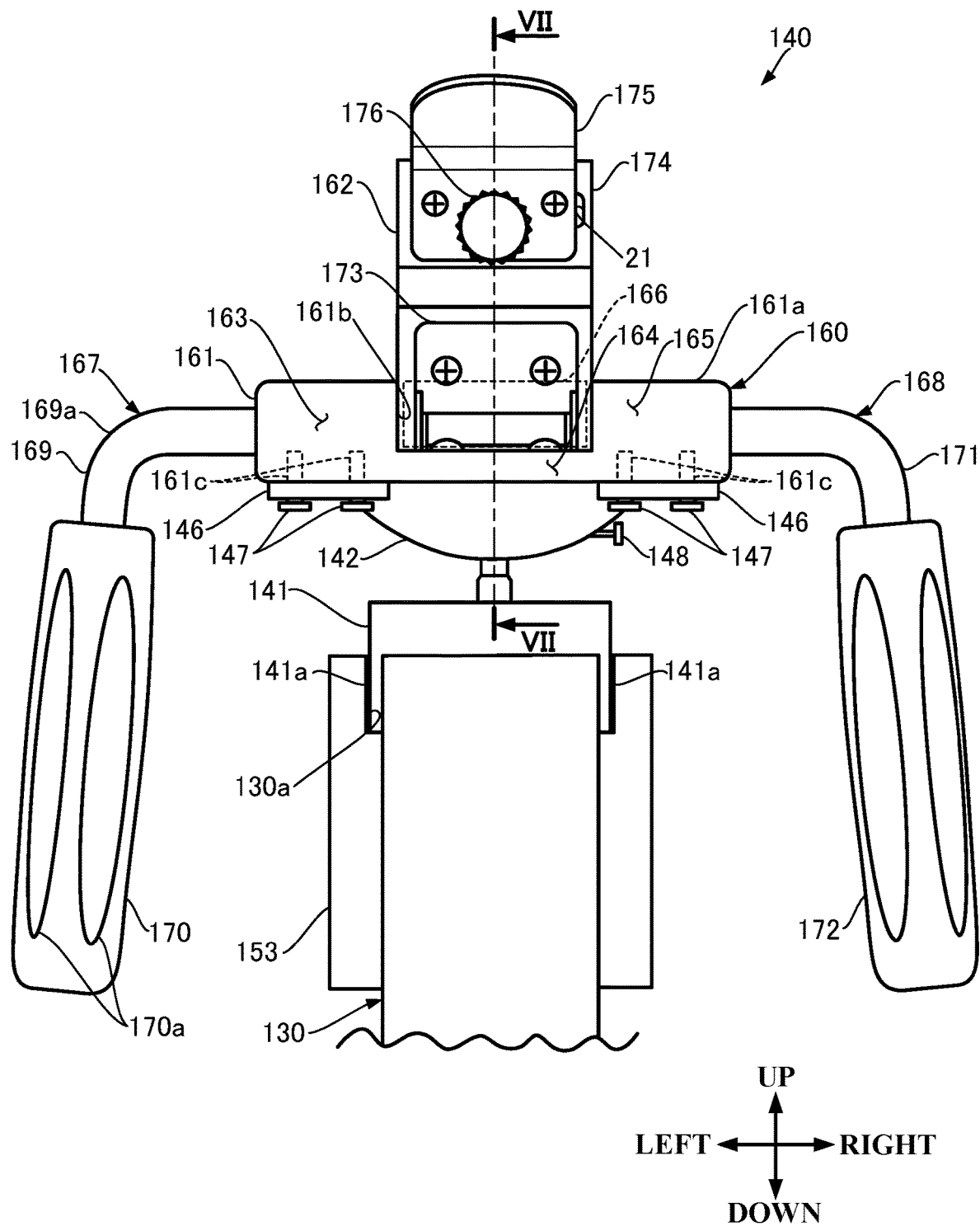
FIG. 5 is a view illustrating a scene in which a rotational portion of the imaging device stand illustrated in FIG. 4 is rotated.

The attachment base 140 is rotatably attached to one end of the second arm 130. The attachment base 140 is rotatable around a rotational shaft 153, as indicated by an arrow R3. As illustrated in FIG. 5, the attachment base 140 includes a coupling portion 141 rotatably attached to the rotational shaft 153; a ball joint 142 screwed on the coupling portion 141; an attachment portion 160 attached to the ball joint 142; and weights 146 attached to the attachment portion 160.

The coupling portion 141 includes insertion portions 141a that are inserted in two slits 130a formed in the end portion of the second arm 130, and the insertion portions 141a are rotatably coupled to the second arm 130. The two slits 130a are formed in an arcuate shape along the shape of the end portion of the second arm 130. If the attachment base 140 rotates around the rotational shaft 153, the coupling portion 141 eventually abuts on edge portions of the slits 130a, and further rotation of the attachment base 140 is restricted. In this manner, the slits 130a formed in the second arm 130 restrict the amount of rotation of the attachment base 140 around the rotational shaft 153.

As illustrated in FIG. 6, the ball joint 142 includes a ball receiver 144, and a ball portion 145 fitted in the ball receiver 144.

A recess 144a, which is opened upward, is formed in the ball receiver 144. The recess 144a has such a shape that a spherical ball portion main body 145a is fitted in the recess 144a. In the ball receiver 144, a bent-back portion 144c, in which an inner wall of the recess 144a is bent back, is formed, and the bent-back portion 144c is put in contact with the ball portion main portion 145a from above, thereby preventing the ball portion main body 145a from slipping out of the recess 144a. The size of the recess 144a is varied by tightening or loosening a thumb screw 148 illustrated in FIG. 4 and FIG. 5, which is provided on a side surface of the ball joint 142. Thereby, the ball portion 145 can be set in a fixed state in the recess 144a, or in a movable state in the recess 144a. Besides, a downwardly projecting male screw portion 144b is formed on a lower surface of the ball receiver 144. The male screw portion 144b is screwed in a screw hole (not illustrated) of the coupling portion 141 illustrated in FIG. 5. In this manner, the ball joint 142 is coupled to the second arm 130.

As illustrated in FIG. 6, the ball portion 145 includes the spherical ball portion main body 145a, and a support column portion 145b projecting from the ball portion main body 145a. The support column portion 145b is fixed to a lower surface of the attachment portion 160 illustrated in FIG. 5. Thus, if the ball portion 145 moves in the recess 144a, the attachment portion 160 moves in accordance with the movement of the support column portion 145b. For example, if the thumb screw 148 illustrated in FIG. 4 is loosened in a case where the support column portion 145b is in an upwardly extending state as illustrated in FIG. 6, the support column portion 145*b* can turn in all directions from the upwardly extending attitude by the movement of the ball portion 145, and can rotate around an axis extending in the direction of extension of the support column portion 145*b*.

Figure 4:
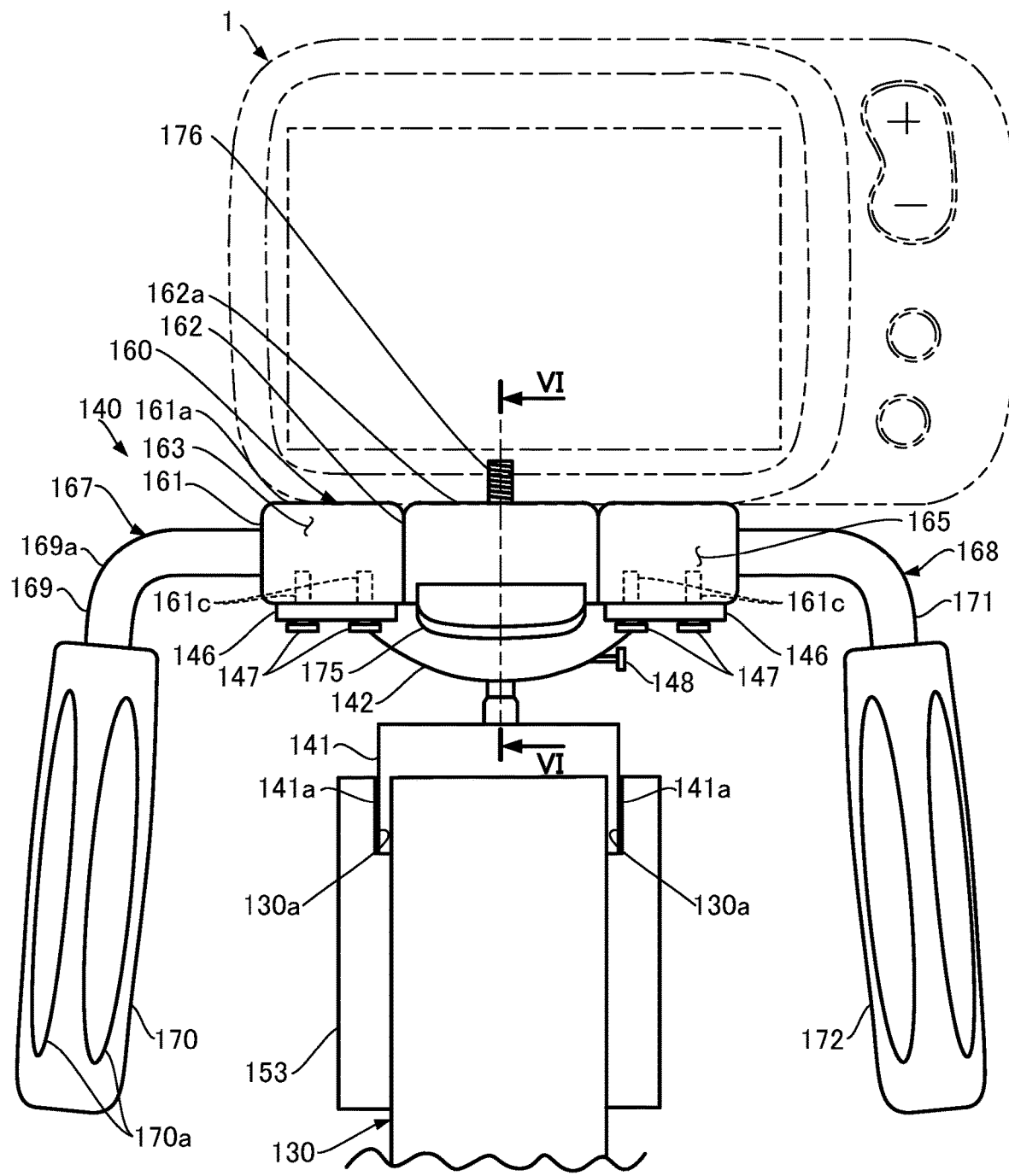
FIG. 4 is a view with attention being paid to a distal end portion of the imaging device stand illustrated in FIG. 1, the distal end portion being viewed in a direction of an arrow IV in FIG. 1.

As illustrated in FIG. 4, the attachment portion 160 includes the base portion 161 coupled to the ball joint 142, and the rotational portion 162 rotatably attached to the base portion 161. Note that the imaging device 1 is attached to the attachment portion 160 in a case where the rotational portion 162 is in a first rotation state (hereinafter, referred to as "unrotated state") in which the rotational portion 162 is not rotated, as illustrated in FIG. 4. At this time, the imaging device 1 is attached such that the right direction of the imaging device 1 agrees with the direction in which a right grip 168 is disposed, and that the left direction of the imaging device 1 agrees with the direction in which a left grip 167 is disposed. When the details of the attachment portion 160 are described, the back-and-forth direction, up-and-down direction and left-and-right direction of the imaging device 1 at a time when the imaging device 1 is attached to the attachment portion 160 are used as appropriate.

As illustrated in FIG. 5, the base portion 161 includes a rotational support portion 164 that rotatably supports the rotational portion 162; a left block 163 having a rectangular parallelepipedic shape, which is disposed on the left side of the rotational support portion 164; and a right block 165 having a rectangular parallelepipedic shape, which is disposed on the right side of the rotational support portion 164.

The rotational support portion 164 is less in height than the left block 163 and right block 165, and a storing space 166 interposed on both sides between the left block 163 and right block 165 is formed above the rotational support portion 164. Specifically, the storing space 166 is defined by a recess portion 161*b* that is formed on an upper surface of the base portion 161, and the rotational portion 162 is rotatably supported on the base portion 161 via a hinge 173 that serves as a rotational component provided in the recess portion 161*b*. In a case where the rotational portion 162 is in the unrotated state, as illustrated in FIG. 4, the upper surfaces of the left block 163, rotational portion 162 and right block 165 are flush with each other, and the surfaces that are flush with each other function as a placement surface on which the imaging device 1 is placed.

As illustrated in FIG. 6, the rotational support portion 164 includes, successively from the rear, a first block 164*a*, a second block 164*b* and a third block 164*c*. Among these blocks, the height of the first block 164*a* is greatest, the height of the second block 164*b* is second greatest next to the first block 164*a*, and the height of the third block 164*a* is smallest. Since the lower surfaces of the first block 164*a*, second block 164*b* and third block 164*c* are disposed to be flush with each other, the upper surface of the rotational support portion 164 is formed to become lower stepwise toward the front. As illustrated in FIG. 6, the upper surface of the first block 164*a* abuts on the rotational portion 162 that is in the unrotated state. Since the second block 164*b* is lower than the first block 164*a*, a space for storing the hinge 173 is formed above the second block 164*b*. In addition, a stepped portion 164*d* formed between the second block 164*b* and third block 164*c* abuts on the rotational portion 162 that is in a second rotation state (hereinafter, referred to as "rotated state") in which the rotational portion 162 is rotated as illustrated in FIG. 7, thereby preventing further rotation of the rotational portion 162.

In addition, as illustrated in FIG. 4 and FIG. 5, the left grip 167 is provided on a left side surface of the base portion 161, and the right grip 168 is provided on a right side surface of the base portion 161. The left grip 167 includes an extension portion 169 that projects from the left side surface of the base portion 161 to the left, is bent at a bend portion 169*a* and extends obliquely downward, and a grip portion 170 provided on an end portion of the extension portion 169. The extension portion 169 is metallic, and is formed of, for example, a rod member of stainless steel. The grip portion 170 is formed of, for example, rubber, and a plurality of grooves 170*a* is formed therein for easier gripping. Note that the right grip 168 has a configuration of left-and-right symmetry to the left grip 167, and includes an extension portion 171 similar to the extension portion 169, and a grip portion 172 similar to the grip portion 170. The grip portion 170 and grip portion 172 are disposed in a fan-like configuration, with a distance therebetween gradually increasing downward.

The weights 146 are provided on the lower surface of the left block 163 and the lower surface of the right block 165, respectively. Two through-holes (not illustrated) are formed in the weight 146. Thumb screws 147 inserted in the through-holes are screwed into screw holes 161*c* formed in the lower surface of the base portion 161, and thereby the weight 146 can be attached to the base portion 161. Note that in a case where the weight 146 is removed from the base portion 161, the thumb screws 147 may be loosened to release the fixation by the thumb screws 147. In this manner, the weights 146 and the base portion 161 are provided with an attachment and detachment structure for attaching and detaching the weights 146.

Figure 7:
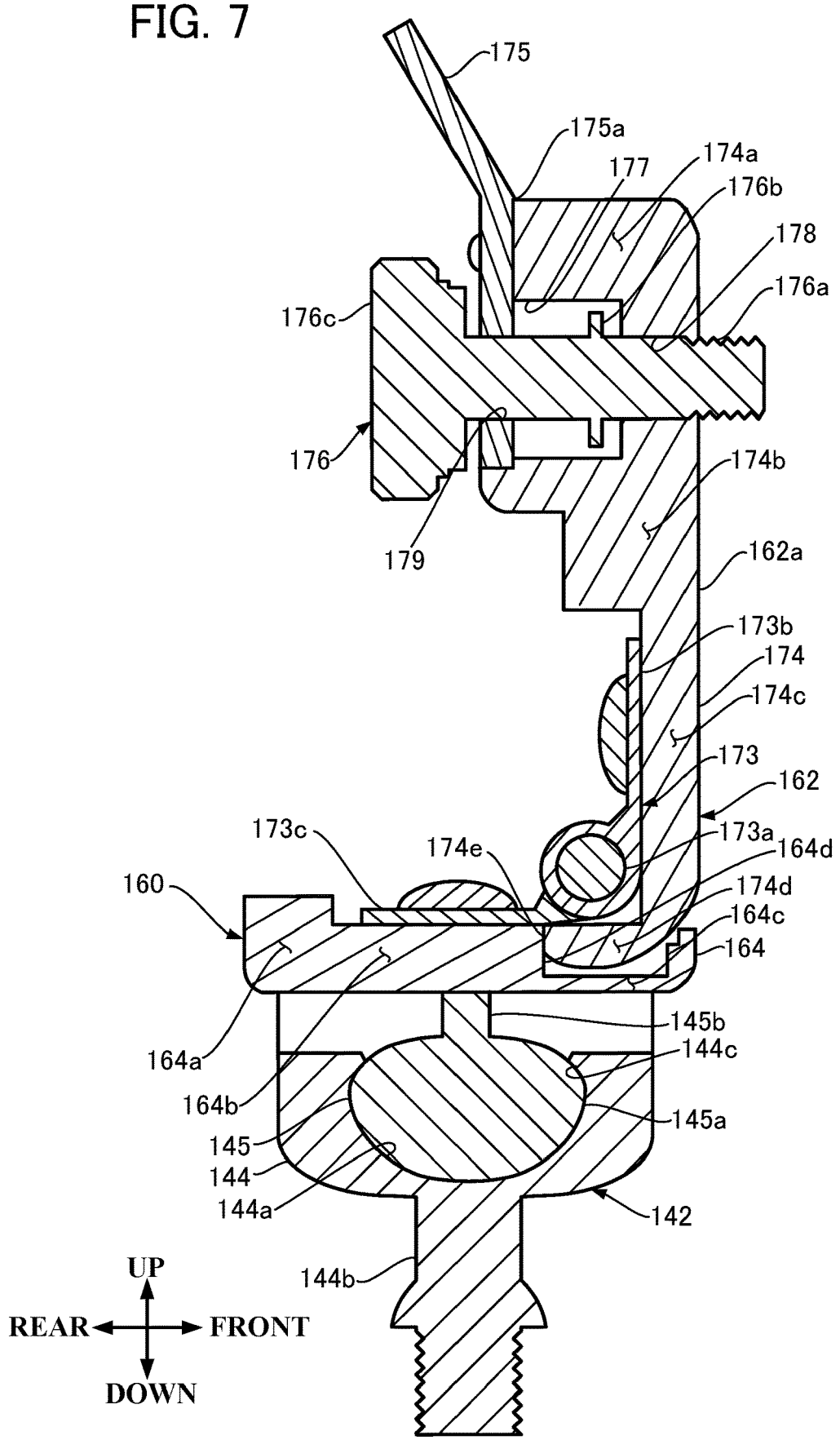
FIG. 7 is a cross-sectional view of the imaging device stand, taken along a cutting-plane line VII-VII in FIG. 5.

As illustrated in FIG. 6 and FIG. 7, the rotational portion 162 is rotatably supported on the rotational support portion 164 via the hinge 173. Thereby, the rotational portion 162 can rotate around a direction of extension of a core rod 173*a* of the hinge 173, that is, the left-and-right direction in the Figures, and can change the attitude between the unrotated state illustrated in FIG. 6 and the rotated state illustrated in FIG. 7. The rotational portion 162 includes a rotational portion main body 174, a handle portion 175 attached to the rotational portion main body 174, and the attachment screw 176 for attaching the imaging device 1 illustrated in FIG. 4 to the rotational portion 162. Note that, depending on whether the rotational portion 162, which is attached to be rotatable around the left-and-right direction by the hinge 173, is in the unrotated state or in the rotated state, the relationship between the back-and-forth direction and the up-and-down direction illustrated in FIG. 4, FIG. 6 and the like varies. Thus, hereinafter, in a case where the rotational portion 162 is described with reference to the back-and-forth direction and the up-and-down direction, it is assumed that the rotational portion 162 is in the unrotated state.

As illustrated in FIG. 5, the width in the left-and-right direction of the rotational portion main body 174 is substantially equal to, or is less than, the width in the left-and-right direction of the rotational support portion 164. Thereby, the rotational portion main body 174 in the unrotated state can be stored in the storing space 166 formed above the rotational support portion 164. On the other hand, as illustrated in FIG. 6, the length in the back-and-forth direction of the rotational portion main body 174 is greater than the length in the back-and-forth direction of the rotational support portion 164. Thus, a part of the rotational portion main body 174 that is in the unrotated state projects rearward from the rotational support portion 164. The rotational portion main body 174 includes, in the order from the rear, a first block 174*a*, a second block 174*b*, a third block 174*c*, and a fourth block 174*d*. Among the first to third blocks, the height of the first block 174*a* is greatest, the height of the second block 174*b* is second greatest next to the first block 174*a*, and the height of the third block 174*c* is smallest. Since the upper surfaces of the first block 174*a*, second block 174*b* and third block 174*c*, which form a placement surface of the imaging device 1, are disposed to be flush with each other, the lower surface of the rotational portion main body 174 is formed to become higher stepwise toward the front.

The first block 174*a* is a part projecting rearward from the rotational support portion 164 in a case where the rotational portion 162 is in the unrotated state. In the first block 174*a*, a first insertion hole 177 with a large diameter and a second insertion hole 178 with a small diameter are continuously formed from below to above, with the centers thereof being aligned. Note that a strap hole 21 is formed in the first block 174*a*.

The handle portion 175 is formed, for example, by bending a metallic flat plate, and includes a bend portion 175*a* that is bent at an obtuse angle. That part of the handle portion 175, which is located on the front side of the bend portion 175*a*, is positioned under the first block 174*a*, and is screwed on the lower surface of the first block 174*a*. In addition, an insertion hole 179 with a center aligned with the first insertion hole 177 is formed in the handle portion 175. On the other hand, that part of the handle portion 175, which is located on the rear side of the bend portion 175*a*, extends obliquely downward from the lower surface of the first block 174*a*. The obliquely downwardly extending part of the handle portion 175 is a part that is held by a user in order to lift and rotate the rotational portion 162.

The attachment screw 176 includes a male screw 176*a* that is formed at a distal end of the attachment screw 176, and a ring-shaped stopper portion 176*b* that is formed on a shaft portion of the attachment screw 176. The attachment screw 176 is inserted, from below, through the first insertion hole 177, second insertion hole 178 and insertion hole 179, and the stopper portion 176*b* is accommodated in the first insertion hole 177. The stopper portion 176*b* cannot pass through the second insertion hole 178 formed in the first block 174*a*, or the insertion hole 179 formed in the handle portion 175, thereby preventing the attachment screw 176 from slipping off. In addition, the male screw 176*a* formed at the distal end of the attachment screw 176 is engaged in the screw hole 23 of the imaging device 1 illustrated in FIG. 3. Thereby, a proper axial tension can be introduced in the shaft portion between the male screw 176*a* and a head portion 176*c*, and the imaging device 1 can be attached to the rotational portion 162 without looseness. In this manner, the rotational portion 162 functions as a support portion that supports the imaging device 1 via the attachment screw 176, and the rotational portion 162 rotates the imaging device 1 by the rotation of the rotational portion 162.

As illustrated in FIG. 6, the second block 174*b* abuts, by the lower surface thereof, on the upper surface of the first block 164*a* in a case where the rotational portion 162 is in the unrotated state. Thereby, counterclockwise rotation in FIG. 6 of the rotational portion 162 is stopped, and the horizontal state of the upper surface 162*a* of the rotational portion 162 is maintained.

As described above, since the height of the third block 174*c* is less than the height of the first block 174*a* and the height of the second block 174*b*, a space for storing the hinge 173 is formed under the third block 174*c*. One leaf 173*b* of the hinge 173 is screwed on the lower surface of the third block 174*c* of the rotational portion main body 174, and the other leaf 173*c* of the hinge 173 is screwed on the upper surface of the second block 164*b* of the rotational support portion 164. Thereby, the rotational portion 162 can rotate around the left-and-right direction in which the core rod 173*a* extends.

The fourth block 174*d* is a part projecting downward from a front portion of the third block 174*c*. A distal end 174*e* of the fourth block 174*d* is formed flat, and the distal end 174*e* abuts on the stepped portion 164*d* formed between the second block 164*b* and third block 164*c* in a case where the rotational portion 162 is in the rotated state as illustrated in FIG. 7. Thereby, clockwise rotation in FIG. 7 of the rotational portion 162 is stopped.

Next, a description is given of a method of photographing a subject using the imaging device 1 and the imaging device stand 100. In order to suppress a shake of the imaging device 1 in image capturing, the image is captured in the state in which the imaging device 1 is attached to the imaging device stand 100. In a case where the imaging device 1 is attached to the imaging device stand 100, the direction of the imaging device 1 is first adjusted, and, as illustrated in FIG. 4, the right direction of the imaging device 1 is directed to the direction in which the right grip 168 is disposed, and the left direction of the imaging device 1 is directed to the direction in which the left grip 167 is disposed. Then, the attachment screw 176 that projects from the attachment portion 160 is screwed into the screw hole 23 formed in the lower surface of the imaging device 1 illustrated in FIG. 3, and the imaging device 1 is coupled to the attachment base 140. Thereby, the imaging device 1 is attached to the imaging device stand 100 as illustrated in FIG. 8, in the state in which the contact surface 16 is put in contact with the upper surface 162*a* of the rotational portion 162 illustrated in FIG. 4, and the contact surfaces 18 and 19 are put in contact with the upper surface 161*a* of the base portion 161 illustrated in FIG. 4. At this time, although gravitational force acts at a center of gravity G1 in the imaging device 1, the center of gravity G1 is on the rear side of the core rod 173*a*. Thus, by the gravitational force of the imaging device 1, a counterclockwise moment in FIG. 8 acts on the rotational portion 162. Note that, as described with reference to FIG. 6, the counterclockwise rotation of the rotational portion 162 is stopped by the lower surface of the second block 174*b* coming in contact with the upper surface of the first block 164*a*. Thus, in a case where the rotational portion 162, to which the imaging device 1 is attached, is in the unrotated state, the counterclockwise moment constantly acts on the rotational portion 162. Thereby, the unrotated state of the rotational portion 162 can be kept, and, at this time, the imaging device 1 is in a first position.

Figure 10:
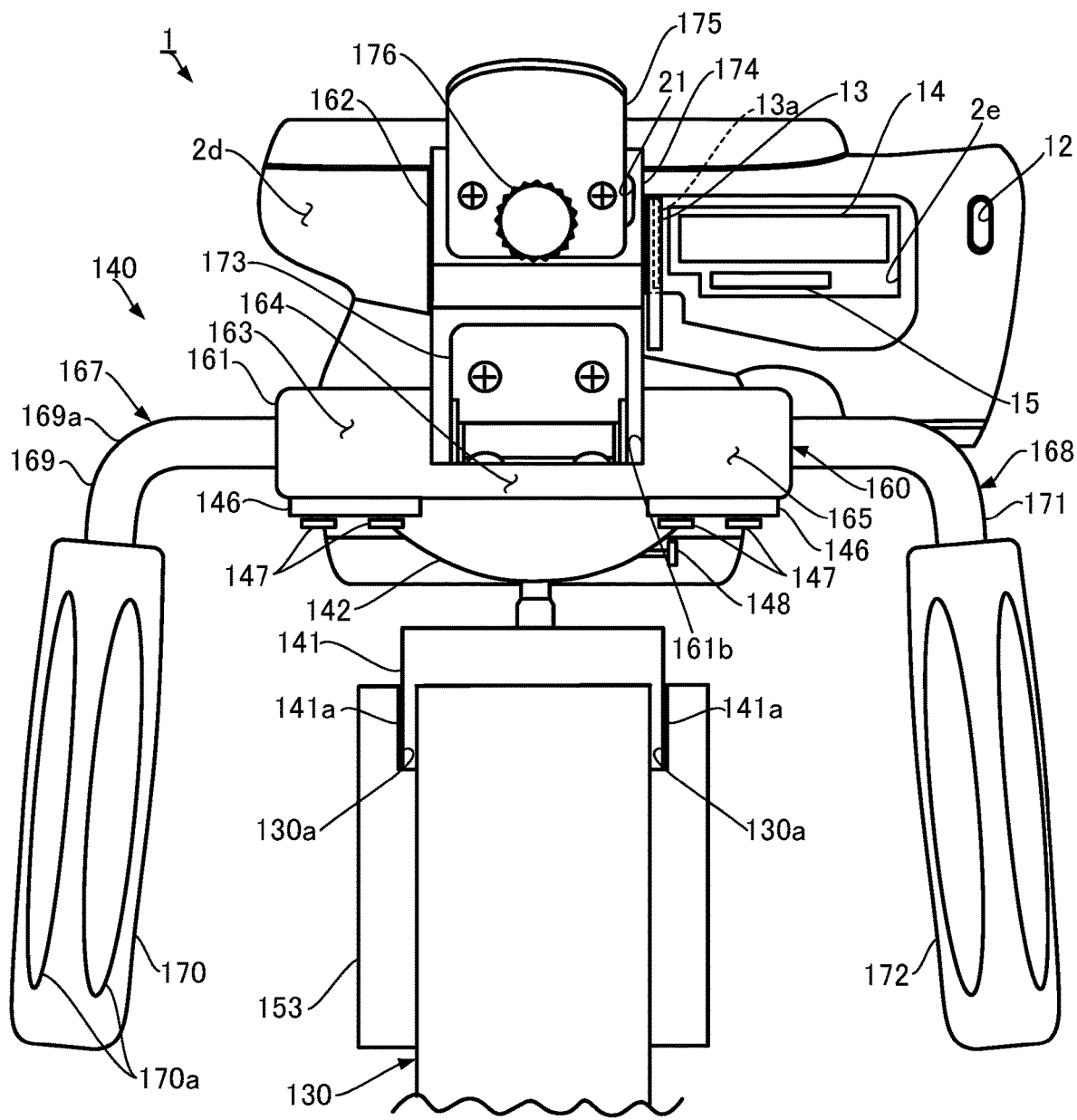
FIG. 10 is a view of the imaging device and the imaging device stand, as viewed in a direction of an arrow X in FIG. 9.

Subsequently, a strap 22 for fall prevention is passed through the strap hole 12 formed in the imaging device 1 and the strap hole 21 formed in the rotational portion 162, and is bound. Note that in FIG. 10, depiction of the strap 22 is omitted so that the appearance of the lower surface 2*d* of the imaging device 1 can be understood.

Note that in a case where the counterweight 123 illustrated in FIG. 1 is raised by the weight of the attached imaging device 1 and the height position of the imaging device 1 cannot be determined, the weights 146 illustrated in FIG. 4 and FIG. 5 may be removed one by one, while seeing the balance, and the weight of the attachment base 140 may be reduced. On the other hand, in a case where the attached imaging device 1 is raised by the weight of the counterweight 123 illustrated in FIG. 1 and the height position of the imaging device 1 cannot be determined, the weights 146 illustrated in FIG. 4 and FIG. 5 may be additionally provided, or the weights 146 may be replaced with heavier ones, thereby keeping the balance with the counterweight 123.

In addition, the user presses the power button 5 illustrated in FIG. 2A to power on the imaging device 1, and, as illustrated in FIG. 8, the user determines a composition while viewing the image of the imaging target displayed on the liquid crystal monitor 6 (FIG. 2B) that functions as the finder. The user can move the imaging device stand 100 to a desired position, for example, by pushing and pulling the erect portion 114 illustrated in FIG. 1 by the hand, and rolling the casters 113 on the floor 50. Furthermore, by holding and moving the left grip 167 and right grip 168 illustrated in FIG. 4 by the hands, the user can perform rotational movements around the rotational shafts 151, 152 and 153 illustrated in FIG. 1. Thereby, the imaging device 1 can be disposed at a position that the user desires, within a movable range of the attachment base 140 in the imaging device stand 100 that is stopped at the desired position. Besides, the user can set the imaging device 1 attached to the attachment portion 160 in a desired direction, by loosening the thumb screw 148 illustrated in FIG. 4 and FIG. 5, which is provided on the side surface of the ball joint 142, and by holding and moving the left grip 167 and right grip 168 by the hands.

After determining the composition in this manner, the user operates the shutter button 4 (FIG. 2A) and captures an image of the subject. Such captured image is stored in the recording medium 15 illustrated in FIG. 3. Upon finishing the image capturing of the subject, the user presses the power button 5 (FIG. 2A) and powers off the imaging device 1. Then, the first arm 120 and second arm 130, which project from the erect portion 114, as illustrated in FIG. 1, are rotated around the rotational shaft 151 and rotational shaft 152 and are folded, and thereby the projection amount from the erect portion 114 can be made compact. Note that in a case where the subject is photographed once again by the imaging device 1, the same operation as described above may be performed.

Figure 9:
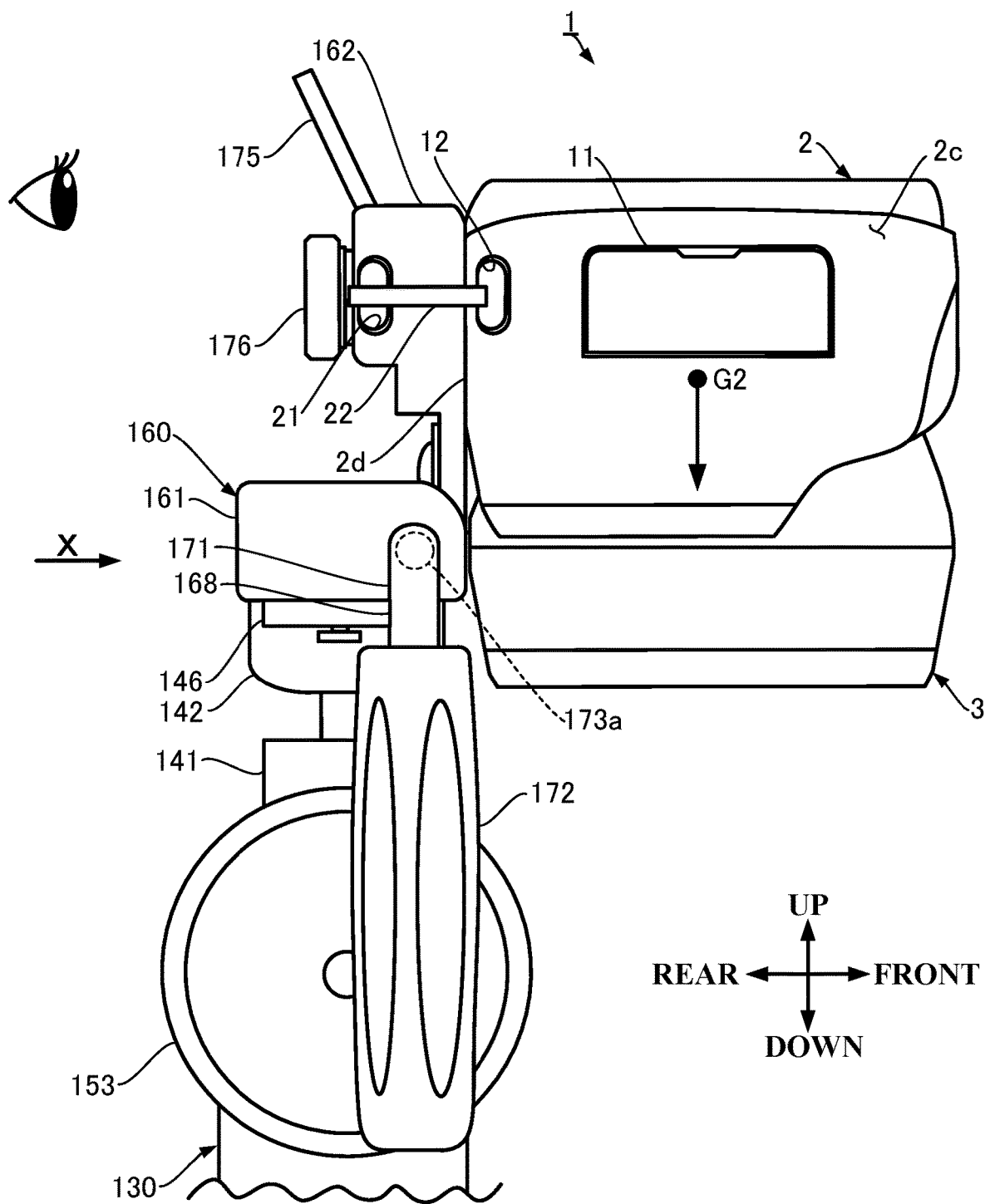
FIG. 9 is a view illustrating a scene in which the rotational portion of the imaging device stand illustrated in FIG. 8 is rotated.

With the repetition of image capturing by the imaging device 1 in this manner, there arises a need to take out the battery 14 illustrated in FIG. 3 in order to charge the battery 14, or to take out the recording medium 15 having a decreased free capacity. In this case, the user rotates the rotational portion 162 over 90 degrees by lifting the handle portion 175 illustrated in FIG. 8, and sets the rotational portion 162 in the rotated state, as illustrated in FIG. 9. Thereby, the imaging device 1 moves to a second position. At this time, although gravitational force acts on a center of gravity G2 in the imaging device 1, the center of gravity G2 is on the front side of the core rod 173a. Thus, clockwise moment in FIG. 9 acts on the rotational portion 162 by the gravitational force of the imaging device 1. Note that, as described with reference to FIG. 7, the clockwise rotation of the rotational portion 162 is stopped by the distal end 174e of the fourth block 174d abutting on the stepped portion 164d. Thus, in a case where the rotational portion 162, to which the imaging device 1 is attached, is in the rotated state, a clockwise moment constantly acts on the rotational portion 162. Thereby, the rotated state of the rotational portion 162 can be maintained.

In this manner, by rotating the rotational portion 162 from the unrotated state to the rotated state and moving the imaging device 1 from the first position to the second position, the rotational portion 162 enters the rotated state as illustrated in FIG. 9, and the imaging device 1 transitions from the state in which the back surface thereof equipped with the liquid crystal monitor 6 is visually recognized by the user positioned on the rear side as illustrated in FIG. 8, to the state in which the lower surface 2d of the imaging device 1 becomes visually recognizable. At this time, as illustrated in FIG. 10, in the lower surface 2d of the imaging device 1, only the contact surface 16 illustrated in FIG. 3 overlaps the rotational portion 162 and is not visually recognizable, but the other part is not covered. Specifically, as illustrated in FIG. 3, in a case where the rotational portion 162 is in the unrotated state, the contact surfaces 18 and 19 are covered by the upper surface 161a of the base portion 161. However, by the rotation portion 162 being rotated into the rotated state, the contact surfaces 18 and 19 formed on the lower surface 2d of the imaging device 1 are released from the upper surface 161a of the base portion 161 (the placement surface of the imaging device 1) and are opened. As a result, nothing covers the cover portion 13 that covers the battery 14 and recording medium 15. Thus, the user can open the cover portion 13, as illustrated in FIG. 10, by sliding the slide portion 13b and rotating the cover portion 13 around the rotational shaft 13a. Thereby, the storing space 2e can be exposed, and the battery 14 and recording medium 15 stored in the imaging device 1 can be taken out. At this time, by loosening the thumb screw 148 and moving the ball joint 142, the imaging device 1 can be directed in such a direction that the battery 14 and recording medium 15 can easily be taken out. Then, the user inserts the battery 14 and recording medium 15 for the next image capturing, closes the cover portion 13, and subsequently can restore the rotational portion 162 into the unrotated state illustrated in FIG. 8 by holding and pulling down the handle portion 175.

According to the above-described embodiment, by opening the cover portion 13 that becomes visually recognizable by lifting the handle portion 175, the battery 14 and recording medium 15 stored in the imaging device 1 can be taken out and inserted. In this manner, since the battery 14 and recording medium 15 can be taken out and inserted in the state in which the imaging device 1 is attached to the imaging device stand 100, an image capturing work can easily be performed.

Additionally, in a case where the rotational portion 162 is in the unrotated state, a part of the cover portion 13 forms the contact surface 19 that is covered by the base portion 161, as illustrated in FIG. 3. Thus, even if the user accidentally hooks his/her finger on the slide portion 13b, the cover portion 13 remains abutted on the base portion 161 and does not open. Therefore, the battery 14 and recording medium 15 are prevented from being erroneously removed.

Additionally, since the grip portion 170 and grip portion 172, which are provided on the left and right sides of the attachment portion 160, are disposed in a fan-like configuration, with a distance therebetween gradually increasing downward, the grip portion 170 and grip portion 172 can easily be held by the hands. Thereby, the imaging device stand 100 can easily be handled.

Additionally, since the base portion 161 is provided with the attachment and detachment structure for attaching and detaching the weights 146, even if imaging devices with different weights are attached, the balance of the imaging device stand 100 can be kept. In this manner, imaging devices 1 having various weights can be attached to the imaging device stand 100.

Additionally, since the imaging device 1 and the imaging device stand 100 are connected by the strap 22, even if the imaging device 1 is detached from the attachment base 140 unexpectedly, the imaging device 1 can be prevented from falling to the floor 50. Furthermore, the attachment position of the strap 22 to the attachment base 140 is set on the rotational portion 162 that rotates together with the imaging device 1. Thus, the relative positional relationship between the attachment position of the imaging device 1 and the attachment position of the imaging device stand 100 does not change before and after the rotational movement of the imaging device 1, and the attached strap 22 can be prevented from hindering the rotational movement of the imaging device 1.

Additionally, since the imaging device 1 is connected to the second arm 130 via the ball joint 142, the imaging device 1 can easily be directed in a desired direction. Thus, stored objects, such as the battery 14 and the recording medium 15, can easily be taken out and inserted.

The present disclosure is not limited to the above-described embodiment, and various modifications and applications are possible. In the above-described embodiment, although the imaging device 1 is described as being the digital camera, the digital camera may be a generally commercially available digital camera, or may be a digital camera for medical use for photographing a diseased part such as the skin or mucous membrane of a human. In addition, the imaging device 1 may be a video camera that mainly captures a moving image. Besides, although the imaging device 1 was described as one example of the electronic device according to the embodiment of the present disclosure, the present disclosure is also applicable to other electronic devices. For example, the present disclosure is applicable to a tablet terminal, a monitor displaying various kinds of information, a measuring device, and the like, and is applicable to a support apparatus for an electronic device, which supports these electronic devices.

Additionally, in a case where the rotational portion 162 is in the unrotated state, the upper surfaces of the left block 163, rotational portion 162 and right block 165 are described as being flush with each other, as illustrated in FIG. 4, but these upper surfaces are not limited to this mode. For example, the upper surface of the rotational portion 162 may be formed higher than, and may be projected from, the upper surfaces of the left block 163 and right block 165. In this case, in the lower surface 2*d* of the imaging device 1 illustrated in FIG. 3, by recessing the area of the contact surface 16 from the other area, the upper surface of the attachment portion 160 can be made to agree with the lower surface 2*d* of the imaging device 1. Thereby, the imaging device 1 can be attached to the imaging device stand in a stable state without looseness of the imaging device 1.

Additionally, whether or not to attach the casters 113 to the imaging device stand is discretionally determined, and whether or not to movably construct the imaging device 1 by providing the first arm 120 and second arm 130 is also discretionally determined. For example, the imaging device stand may be a tripod that is used by being placed on a desired position on the floor or the ground. In this case, too, the advantageous effects of the present disclosure can be obtained by applying to the tripod the structure of the attachment base 140 to which the imaging device 1 is attached.

Additionally, a lock mechanism, which mechanically stops the movement of the rotational portion 162 that is in the rotated state and in the unrotated state, may be provided to prevent unexpected rotation of the rotational portion 162. For example, the lock mechanism may be a stopper member that comes in contact with the rotational portion 162 and stops the rotation of the rotational portion 162, and the rotational portion 162 may be configured to be rotatable between the rotated state and the unrotated state by releasing the contact by the stopper member.

Additionally, the rotational portion 162 was described as rotating over 90 degrees between the rotated state and the unrotated state. However, the angle over which the rotational portion 162 can rotate can freely be set. Specifically, it suffices if such an enough rotation amount is secured that, by the rotation from the unrotated state to the rotated state, the lower surface 2*d* of the imaging device 1 is separated from the member that covers the cover portion 13, and the insertion and take-out of a stored object from the opened cover portion 13 is allowed.

Additionally, as illustrated in FIG. 3, a strap detector 24 may be provided near the strap hole 12. If the strap detector 24 detects the passing of the strap 22 through the strap hole 12, this fact may be displayed on the liquid crystal monitor 6. In addition, if the strap detector 24 does not detect the passing of the strap 22 in the power-on state of the imaging device 1, the liquid crystal monitor 6 may display such an alert that the strap 22 is not passed through the strap hole 12. Thereby, such a situation can be prevented that the user accidentally lets the imaging device 1 fall.

Additionally, as illustrated in FIG. 3, an attachment screw detector 25 may be provided near the screw hole 23. If the attachment screw detector 25 detects that the attachment screw 176 illustrated in FIG. 4 is screwed in the screw hole 23, this fact may be displayed on the liquid crystal monitor 6. In addition, if the attachment screw detector 25 does not detect the attachment screw 176 in the power-on state of the imaging device 1, the liquid crystal monitor 6 may display such an alert that the imaging device 1 is not fixed. Thereby, such a situation can be prevented that the imaging device 1 is let to fall due to incomplete fixation of the imaging device 1.

Additionally, in the above description, the rotational portion (support portion) 162 is rotatably attached to the base portion 161, and the imaging device 1 is rotated in accordance with the rotation of the rotational portion (support portion) 162. However, the mode of the movement of the rotational portion (support portion) 162 and the imaging device 1 is not limited to the rotation. For example, the rotational portion (support portion) 162 may be attached to be movable in a horizontal direction or a vertical direction, and, by moving the rotational portion 162, the imaging device 1 may be moved between the first position where the stored objects cannot be taken out, and the second position where the stored objects can be taken out.

Additionally, the state, in which the imaging device 1 is in the first position and the stored objects such as the battery 14 cannot be taken out, includes a state in which, in a case where at least a part of the storing space 2*e* of the stored objects is covered by the base portion 161, at least a part of the cover portion 13 covering the storing space 2*e* is covered by the base portion 13 and cannot be opened or closed, and a state in which, although the storing space 2*e* and cover portion 13 are not covered, at least a part of the slide portion 13*b* (the mechanism for opening and closing the storing space 2*e*) for opening and closing the cover portion 13 is covered by the base portion 161 and the cover portion 13 cannot be opened or closed. In addition, the imaging device 1 moves to the second position, thus being released from the state of the covering by the base portion 161, and enabling take-out of the stored objects such as the battery 14.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A support apparatus for an electronic device, the support apparatus comprising:
a support portion that movably supports the electronic device between a first position in which an object stored in the electronic device is incapable of being taken out and a second position in which the stored object is capable of being taken out,
wherein;
the electronic device is attachable to the support portion, and
the electronic device is moved between the first position and the second position by rotation of the support portion.

2. The support apparatus according to claim 1, further comprising a base portion to which the support portion is movably attached,
wherein the rotation of the support portion relative to the base portion causes the electronic device to move between the first position and the second position.

3. The support apparatus according to claim 2, wherein in the first position, at least a part of a storing space of the electronic device for storage of the object is covered by the base portion, and in the second position, the at least the part of the storing space is separated from the base portion and is accessible.

4. The support apparatus according to claim 2, wherein the rotation of the support portion relative to the base portion causes a change in an attitude of the support portion between a first rotation state in which a position of the electronic device is set in the first position, and a second rotation state in which the position of the electronic device is set in the second position.

5. The support apparatus according to claim 4, wherein;
the electronic device is attached to the support portion in such a state that a part of an attachment surface of the electronic device is opposed to the support portion,
in a case where the support portion is in the first rotation state, the base portion and the support portion form a placement surface that is opposed to the attachment surface of the electronic device, and
rotation of the support portion from the first rotation state to the second rotation state causes the attachment surface of the electronic device to be separated from the placement surface of the base portion.

6. The support apparatus according to claim 5, wherein:
the placement surface of the base portion has a recess portion, and
the support portion is rotatably supported by a rotational component provided in the recess portion.

7. The support apparatus according to claim 5, wherein a change of a rotational angle of the support portion relative to the base portion between the first rotation state and the second rotation state causes a transition from a state in which a back surface of the electronic device is visually recognizable to a state in which the attachment surface is visually recognizable.

8. The support apparatus according to claim 5, wherein the support portion includes a stopper portion that abuts on the base portion to prevent further rotation, upon rotation of the support portion from the first rotation state to the second rotation state.

9. The support apparatus according to claim 5, wherein;
the electronic device comprises an imaging device,
the support portion is set in the first rotation state in a case where an image is captured using the imaging device, and
the support portion is set in the second rotation state in a case where the object is to be taken out from the imaging device and in a case where the object is to be inserted into and stored in the imaging device.

10. The support apparatus according to claim 5, wherein the support portion is provided with a handle portion operable by a user to rotate the support portion between the first rotation state and the second rotation state.

11. An electronic device attachable to the support apparatus according to claim 5, wherein;
the attachment surface is provided with a cover portion for opening and closing a storing space for the object, and
the cover portion is disposed in an area that is not covered by the support portion to which the electronic device is attached.

12. The electronic device according to claim 11, wherein:
the electronic device comprises an imaging device, and
the object comprises at least one of a battery that supplies electricity and a recording medium that records data obtained by image capturing.

13. The support apparatus according to claim 2, further comprising a support leg configured to be placed on a floor, wherein;
an arm portion is provided between the support leg and the base portion,
the arm portion is rotatably supported on the support leg at an intermediate portion of the arm portion,
one end of the arm portion is connected to a counterweight, and
the other end of the arm portion is connected to the base portion.

14. The support apparatus according to claim 13, wherein the base portion comprises an attachment and detachment structure for attaching and detaching a weight for keeping a balance with the counterweight.

15. The support apparatus according to claim 13, wherein grips holdable by a user when moving the base portion are provided on both sides of the base portion.

* * * * *